United States Patent [19]

McEathron

[11] 3,967,864
[45] July 6, 1976

[54] FLUID BRAKE CONTROL SYSTEM

[75] Inventor: Eugene Douglas McEathron, Watertown, N.Y.

[73] Assignee: General Signal Corporation, Rochester, N.Y.

[22] Filed: Aug. 20, 1975

[21] Appl. No.: 606,139

[52] U.S. Cl. .................................. 303/81; 303/43
[51] Int. Cl.² .................................. B60T 15/44
[58] Field of Search .................. 303/37, 43, 66, 81, 303/86

[56] References Cited
UNITED STATES PATENTS
1,314,974  9/1919  Neal .................................... 303/37

*Primary Examiner*—George E. A. Halvosa
*Attorney, Agent, or Firm*—Harold S. Wynn

[57] ABSTRACT

A fluid brake control system is disclosed having an improved emergency application and stability control device for use in association with a brake control pipe, emergency and auxiliary fluid reservoirs, a first quick action chamber, a brake cylinder, and emergency and service control valves. An improved emergency application and stability control valve is provided comprising a housing containing a differential abutment subject to actuation axially by differences in fluid pressures in respective brake pipe pressure and quick action control pressure chambers on opposite sides of the abutment. The control device has at least one ball poppet type valve on each side of the abutment that is spring biased toward a closed position and has an operating push rod longitudinally disposed between the associated valve and the abutment. The poppet valve on one side of the abutment is opened by movement of the abutment in one direction for permitting application of fluid from the emergency reservoir to the brake cylinder. The poppet valve on the other side of the abutment is opened by movement of the abutment in the opposite direction to permit charging of the first quick action chamber at a controlled rate from the brake pipe. A stabilizing spring is provided in the brake pipe pressure chamber biasing the abutment normally in a direction to close the poppet valve on said one side of the abutment and to open the poppet valve on the other side of the abutment.

7 Claims, 1 Drawing Figure

U.S. Patent  July 6, 1976  3,967,864
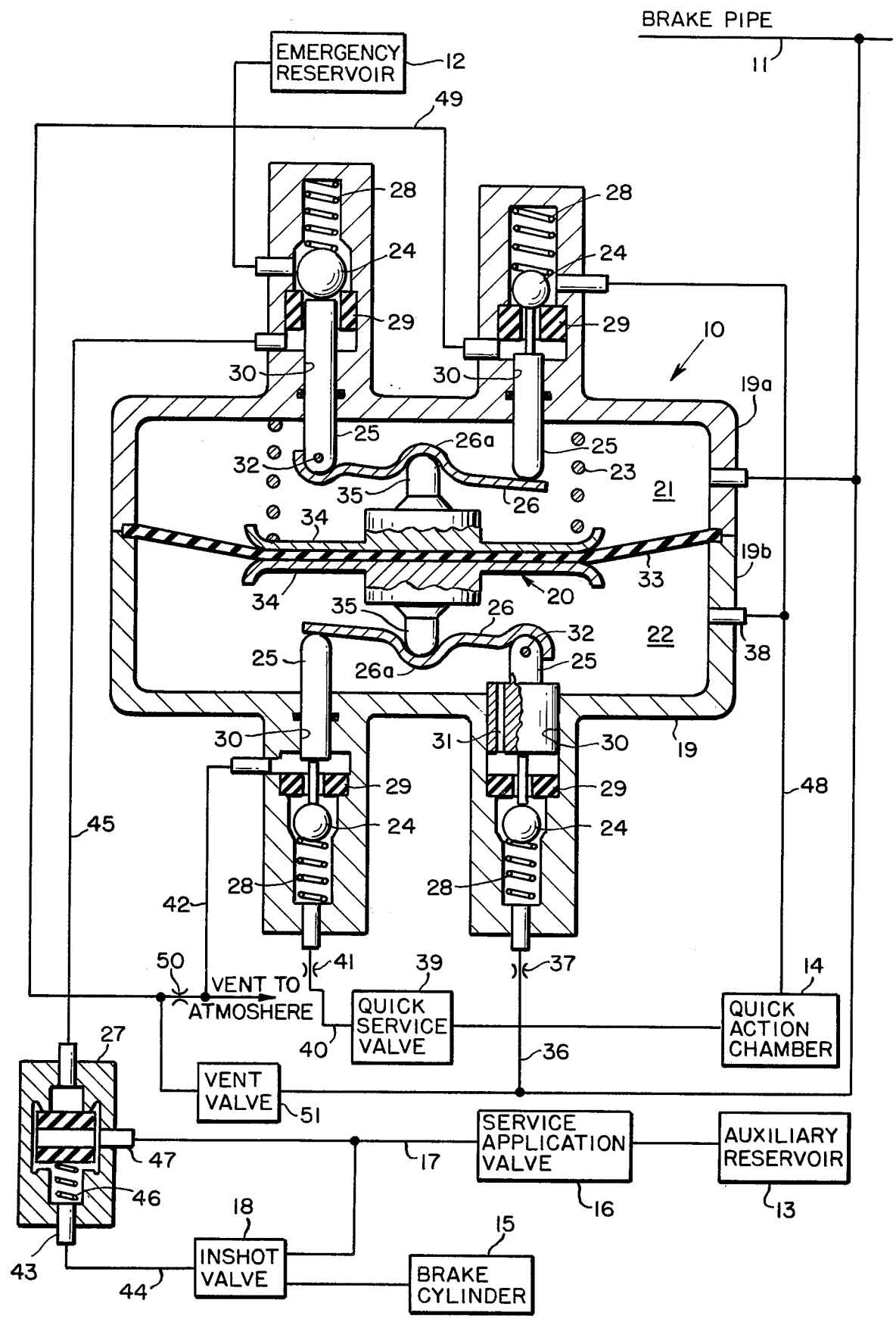

FLUID BRAKE CONTROL SYSTEM

BACKGROUND OF INVENTION

This invention relates to fluid brake control systems, and while the invention is subject to a wide range of applications, a preferred embodiment of the invention will be particularly described as applied to a fluid control system having an improved emergency application and stability control device.

The present invention is an improvement over currently used emergency application control devices such as the emergency application valve of the well-known ABD control valve generally used for governing the brakes of freight cars. In the ABD valve, an emergency application control valve is provided in the form of a movable abutment operated slide valve well-known to those skilled in the art. This valve is costly to manufacture, requires substantial longitudinal movement to provide the selections required, and requires periodic maintenance for lubrication of sliding valve parts.

An object of the present invention is to provide a fluid brake control system having an improved emergency application and stability control device which substantially obviates one or more of the limitations and disadvantages of the described prior systems.

Another object of the present invention is to reduce manufacturing and maintenance costs of an emergency application and stability control device.

Other objects, purposes and characteristic features of the present invention will be in part obvious from the accompanying drawing and in part pointed out as the description of the invention progresses.

SUMMARY OF INVENTION

A fluid brake control system is disclosed having an improved emergency application and stability control device for use in association with a brake control pipe, emergency and auxiliary fluid reservoirs, a first quick action chamber, a brake cylinder, and a service control valve. The control device has a housing containing a differential abutment subject to actuation from a normal position by differences in fluid pressure in respective brake pipe pressure and quick action control pressure chambers on opposite sides of the abutment. At least one poppet type valve is disposed in the housing on each of the opposite sides of the abutment, is spring biased toward a closed position and has an operating push rod longitudinally disposed between the associated valve and the abutment. A poppet valve on one side of the abutment is opened by movement of the abutment in one direction for permitting application of fluid from the emergency reservoir to the brake cylinder. A poppet valve on the other side of the abutment is opened by movement of the abutment in the opposite direction to permit charging of the first quick action chamber at a controlled rate from the brake pipe. A stabilizing spring is provided in the brake pipe pressure chamber biasing the abutment normally in a direction to close the poppet valve on one side of the abutment and to open the poppet valve on the other side of the abutment.

A second poppet type valve is provided on each side of the abutment and a bridge is provided in each of the control device pressure chambers disposed across ends of valve operating push rods in the associated chambers, the bridges being subject to actuation by contact at an intermediate point with the abutment.

A fluid circuit is closed in response to the opening of the second poppet valve on one side of the abutment for opening a vent valve to vent fluid from the brake pipe in response to an emergency rate of reduction in the brake pipe pressure. This poppet valve is also effective when opened to vent the first quick action chamber at a controlled rate.

The second valve in the other pressure chamber of the control device is provided for selectively permitting venting of the first quick action chamber through a quick service valve, dependent upon whether brake pipe pressure is reduced at a service or emergency rate.

A double-acting check valve is provided for selectively permitting neutralization of pressure across an inshot valve in accordance with whether or not the emergency control device has sensed an emergency rate of brake pipe reduction.

For a better understanding of the present invention, together with other and further objects thereof, reference is had to the following description taken in connection with the accompanying drawing, while its scope will be pointed out in the appending claims.

The accompanying drawing illustrates a preferred embodiment of the present invention schematically and by an axial sectional view of the emergency application and stability control device and an associated double-acting check valve.

With reference to the drawing, a fluid brake control system is disclosed having an improved emergency application and stability control device 10 for use in association with a brake control pipe 11, emergency and auxiliary reservoirs 12 and 13 respectively, a first quick action chamber 14, a brake cylinder 15 and a service application valve 16 for governing flow of fluid from auxiliary reservoir 13 through a brake application passage 17 and an inshot valve 18 to the brake cylinder 15. The control device 10 has a housing 19 containing a differential abutment 20 subject to actuation axially by differences in fluid pressure in brake pipe pressure and quick action control pressure chambers 21 and 22 respectively on opposite sides of the abutment 20. A stabilizing spring 23 is disposed between the upper wall of the housing 19 and the abutment 20 for biasing the abutment 20 downwardly from a central position to a normal position when the chambers 21 and 22 are subjected to substantially the same fluid pressure. Two laterally disposed poppet type valves 24 are provided in the housing 19 on each side of the abutment 20 having longitudinal valve operating push rods 25 connected by a bridge 26 disposed between ends of the push rods 25 and the abutment 20.

An associated double-acting check valve 27 is provided for selectively governing neutralization of pressures across inshot valve 18 in accordance with whether or not the control device 10 has sensed an emergency rate of brake pipe reduction by the actuation upwardly of the abutment 20.

The ball poppet type valves 24 of the device 10 are disposed in the housing 19 on opposite sides of abutment 20, are biased in the direction of the abutment 20 by springs 28, the upper valves 24 being normally biased against their seats 29 to provide that these valves are normally closed, and the lower valves 24 are normally maintained off of their seats 29 because of the actuation of abutment 20 downwardly by spring 23.

Push rods 25 are freely slideable in bores 30 in the housing 19 and have suitable O-rings associated therewith when necessary for preventing fluid leakage from the chambers 21 and 22. The lower right-hand push rod 25 is of a larger diameter than the others for providing a longitudinal passage 31 therethrough connecting chamber 22 with the chamber of the associated valve 24. Each of the bridges 26 has one end formed around the end of a push rod 25 and pivotally secured thereto by a pin 32.

Abutment 20 comprises a flat diaphragm 33 having its outer periphery suitably secured between upper and lower housing portions 19a and 19b. The abutment 20 also comprises annular diaphragm follower plates 34 secured on upper and lower sides of the diaphragm 33 respectively. Each of the plates 34 has an axial detent 35 extending in a direction away from the diaphragm 33 and cooperating with a recess at a midpoint 26a in one of the bridges 26.

In practice, the improved emergency application and stability control device 10 that has been described can be used in place of valves providing corresponding functions in the ABD valve, for example, thus simplifying and improving the ABD valve control apparatus. It should be considered that the simplified disclosure of a railway car braking system in the present embodiment is done to simplify the disclosure of the present invention rather than to limit the environment in which the invention can be applied. For example, additional controls can be provided as is well-known in the ABD valve for charging the reservoirs, control of the rate of charging of the brake cylinder 15 and the like.

The system according to the present invention, like the ABD valve, is considered to be normal condition when the brake pipe 11, emergency reservoir 12, auxiliary reservoir 13, and quick action chamber 14 are all charged to the normal brake pipe pressure which is in most cases 70 pounds. The upper chamber 21 of the device 10 is connected to the brake pipe 11 and the lower chamber 22 is connected to the quick action chamber 14. Thus normally the fluid pressures of chambers 21 and 22 are substantially equal. The quick action chamber 14 is charged at this time from the brake pipe 11 through passage 36, choke 37, lower right-hand valve 24, passage 31, chamber 22, and port 38 of the control device 10. This valve 24 permits charging of the quick action chamber through the choke 37 except when abutment 20 is actuated to its upper position in accordance with an emergency brake application. The closure of lower right-hand valve 24 under these conditions is desirable to conserve the quick action chamber 14 air for timing and other control purposes.

The normally opened left-hand valve of the control device 10 provides a path for quick service venting of the quick action chamber 14 under conditions when a quick service valve 39 is active. The quick service valve 39 can be, for example, similar to a type B1 valve that is well-known and widely used in railway braking systems. The quick service valve 39 is active to remove fluid from the quick action chamber 14 only during the time of brake pipe pressure reduction in brake pipe 11 to signal a brake application. Thus there is fluid output of quick service valve 39 to passage 40 only under these braking signal conditions. Operation of quick service valve 39 after an emergency braking signal has been sensed by the movement of abutment 20 upwardly is not required, and thus to conserve quick action chamber 14 fluid, a path from passage 40 to atmosphere is closed by the closure of the lower left-hand valve 24. With the control device 10 in its normal condition upon receiving a service reduction in brake pipe 11, the quick service valve 39 becomes active, and fluid is discharged from the quick action chamber through this valve through passage 40, choke 41, valve 24 and vent passage 42 to atmosphere.

In response to a service brake pipe reduction, the service application valve 16 actuates to apply auxiliary reservoir 13 fluid over passage 17 through inshot valve 18 to brake cylinder 15. Fluid from passage 17 also passes through the lower portion of the double check valve 27 through outlet port 43 and passage 44 to a neutralizing chamber on one side of an abutment in the inshot valve 18 for providing the desired rate of charging of the brake cylinder 15 for a service application as is the usual practice in the ABD valve.

If there is an emergency brake pipe reduction, the rapid reduction of brake pipe pressure as applied in chamber 21 of device 10 relative to the slower reduction in pressure of chamber 22, causes the abutment 20 to be shifted upwardly to open the valves 29 above the abutment 20 and to close the valves 29 below the abutment 20. Opening of the upper left-hand valve 29 connects fluid from the emergency reservoir 12 to the brake cylinder 15 through valve 29 in its open position, passage 45, double check valve 27, passage 17, and inshot valve 18 to brake cylinder 15. Pressure of fluid in passage 45 compresses spring 46 in check valve 27 and closes the connection of passage 17 to passage 44 while opening a connection from passage 45 to passage 17. It will be noted that by sealing off passage 44, there is no balancing of the abutment of inshot valve 18, and thus inshot valve 18 selects the proper rate of flow to brake cylinder 15 for an emergency application.

The opening of the upper right-hand valve 29 provides a timing discharge path during emergency application for the quick action chamber 14 extending from quick action chamber 14 through passage 48, upper right-hand valve 29 in its open position, passage 49 and choke 50 to atmosphere. This insures that the brakes will be maintained applied until there has been time to bring the train to a stop. Vent valve 51 is also actuated by pressurization of passage 49 for venting the brake pipe 11 to atmosphere.

Recharging of the brake pipe 11 for the release of an emergency application actuates abutment 20 downwardly by the increase in brake pipe pressure after the quick action chamber 14 pressure has been sufficiently reduced to open the lower valves 29 and close the upper valves 29 and thus restore the system to its normal conditions. The opening of the lower right-hand valve 29 by the movement downwardly of abutment 20 permits the quick action chamber 14 to be recharged from the brake pipe through choke 37, lower right-hand valve 29, and pressure chamber 22.

Having thus described a fluid brake control system for a vehicle having an improved emergency application and stability control device as a preferred embodiment of the present invention, it is to be understood that various modifications and alterations may be made to the specific embodiment shown without departing from the spirit or scope of the invention.

What is claimed is:

1. A fluid brake control system for a vehicle having a brake control pipe, emergency and auxiliary fluid reservoirs, a first quick action chamber, a brake cylinder, and service and emergency control valves wherein an improved emergency application and stability control device is provided comprising;

a. a housing containing a differential abutment subject to actuation axially by differences in fluid pressures in brake pipe pressure and quick action control pressure chambers on opposite sides of the abutment,
b. at least one poppet type valve means disposed in the housing on each of said opposite sides of the abutment and located partly in each of said brake pipe pressure chamber and said quick action control pressure chamber spring biased toward a closed position and having an operating push rod longitudinally disposed between the associated valve means and the abutment,
c. the poppet valve means on one side of the abutment being opened by movement of the abutment in one direction and having means for permitting application of fluid from the emergency reservoir to the brake cylinder when this valve is opened,
d. the poppet valve means on the other side of the abutment being opened by movement of the abutment in the opposite direction and having means to permit charging of the first quick action chamber at a controlled rate from the brake pipe when this valve is opened, and
e. a stabilizing spring in the brake pipe pressure chamber biasing the abutment in a direction to normally open the poppet valve means on the other side of the abutment.

2. A fluid brake control system according to claim 1 wherein the control device has a second poppet type valve means on each side of the abutment, a bridge in each of the control pressure chambers subject to actuation by the abutment at an intermediate point, and push rods disposed longitudinally between the valve means and ends of the bridges on the same sides of the abutment for causing actuation of the valve means in accordance with movement of the abutment.

3. A fluid brake control system according to claim 2 wherein fluid pressure means is provided responsive to the opening of the second poppet valve means on said one side of the abutment for opening a vent valve to vent fluid from the brake pipe.

4. A fluid brake control system according to claim 3 wherein means responsive to the opening of the second poppet valve means on said other side of the abutment is provided for venting the first quick action chamber at a controlled rate.

5. A fluid brake control system according to claim 4 wherein quick service valve means is provided for selectively venting fluid from the first quick action chamber and means including the second poppet valve means on the other side of the abutment is provided for selectively permitting venting of the first quick action chamber through the quick service valve means, dependent upon whether brake pipe pressure is reduced at a service or an emergency rate.

6. A fluid brake control system according to claim 1 wherein inshot valve means is provided for governing the rate of flow of fluid to the brake cylinder from the reservoirs and double-acting check valve means is provided to permit a balancing fluid pressure to flow to the inshot valve during a service brake application, said poppet valve means on said one side of the abutment being effective when opened by movement of the abutment upon sensing an emergency application rate of reduction of the brake pipe to actuate the double acting check valve and prevent balancing pressure from being applied to the inshot valve means.

7. A fluid brake control system according to claim 6 wherein the check valve means has one inlet port, one outlet port, and a third port that is an inlet port for service brake application and an outlet port for emergency brake application, and means is provided for passage of fluid from the emergency reservoir to the brake cylinder during emergency application through said poppet valve means on said one side of the abutment and through the inlet and third ports of the check valve means in series.

* * * * *